Jan. 25, 1938.  H. PLETCHER ET AL  2,106,506
BROILER
Filed Nov. 22, 1935  2 Sheets-Sheet 2
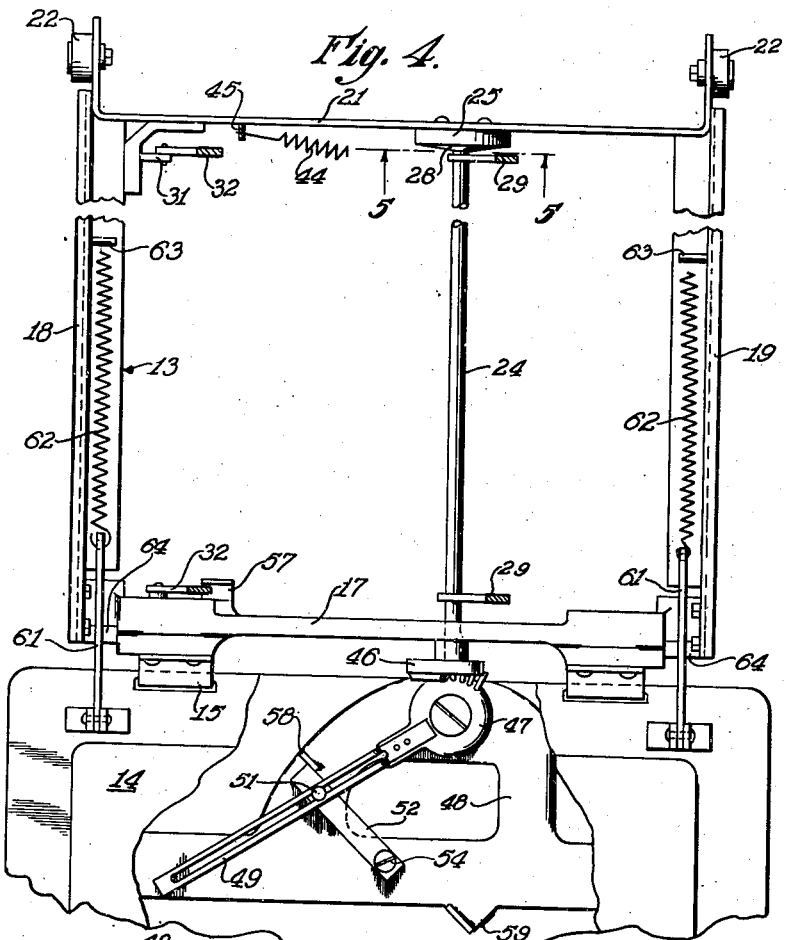

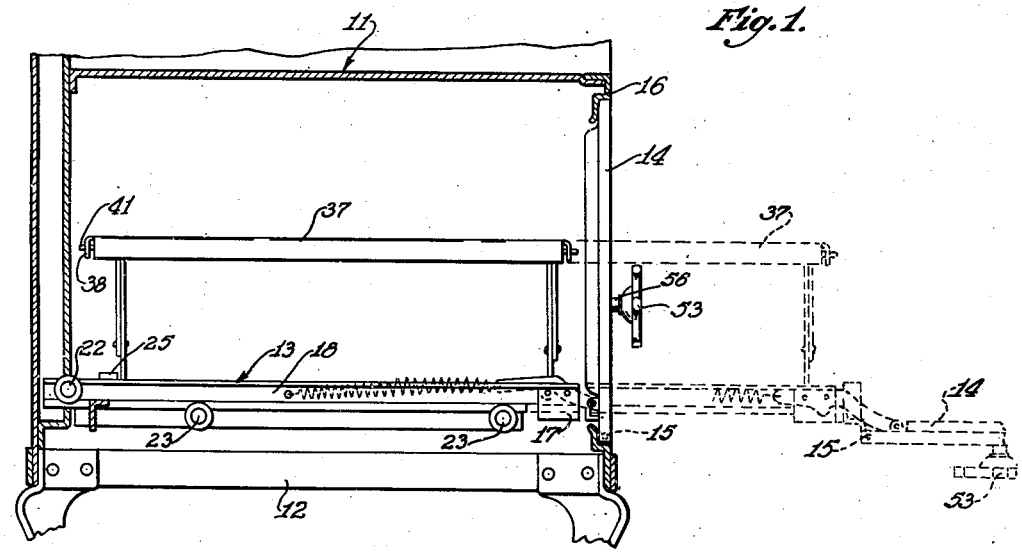

Patented Jan. 25, 1938

2,106,506

UNITED STATES PATENT OFFICE 2,106,506

BROILER

Harry Pletcher, Mark Bishop, and Benjamin C. Jones, Joliet, Ill., assignors to The Moore Corporation, Joliet, Ill., a corporation of Delaware Application November 22, 1935, Serial No. 51,106

8 Claims. (Cl. 126—41)

This invention relates in general to broilers for fluid fuel burning stoves, and has more particular reference to mechanism for adjustably varying the distance between the broiler pan and/or the product being cooked and the broiler burner.

Mechanism for the same general purpose has heretofore been provided in United States Letters Patent No. 1,811,428, issued June 23, 1931, and No. 1,861,689, issued June 7, 1932, and in the co-pending application of Richard S. Weston, Serial No. 14,015 filed April 1, 1935. In the devices of these two patents, physical access to the product being cooked can be had only upon withdrawal of the broiler drawer. In the application referred to, the raising and lowering mechanism for the broiler pan is provided with actuating or control means extending outwardly through a closure member for the broiler oven, which is so arranged that the closure member may be opened without affecting the pan raising and lowering means in order to give access to the product being cooked without removing the latter from the oven.

A principal object of the present invention is the provision of raising and lowering means for a broiler pan, having actuating or control means therefor extending outwardly through a closure member for the broiler oven, with the several parts so arranged that the actuating or control means may be operated to cause raising or lowering of the broiler pan in any position of the closure member, which may be opened to give access to the product being cooked without removing the latter from the oven.

Another important object of the invention is the provision in such a broiler of a hinged closure member upon which is mounted mechanism for controlling the vertical height of the broiler pan when the member is in any position.

A further object of the invention is the provision of novel means for maintaining the broiler pan in any adjusted position.

Numerous other objects and advantages of the invention will be apparent as it is better understood from the following description, which, when taken in connection with the accompanying drawings, discloses a preferred embodiment thereof.

In the drawings,

Figure 1 is a vertical sectional view through a broiler oven embodying the features of our invention, and provided with a drawer shown in partially withdrawn position with the door therefor open (as shown in dotted lines);

Fig. 2 is a front elevation of the broiler pan and actuating mechanism therefor, with the pan in raised position and the door opened, and with parts shown in section;

Fig. 3 is a view similar to Fig. 2 showing the pan in lowered position;

Fig. 4 is a top plan view of the interior of the broiler drawer with the door open and parts broken away;

Fig. 5 is a detail vertical section taken substantially on the line 5—5 of Fig. 4, parts being broken away; and Fig. 6 is a detail vertical section taken substantially on the line 6—6 of Fig. 2 with the door in closed position.

For the purpose of illustrating the invention, we have shown in the drawings a broiler compartment or oven of any desired or well-known construction, indicated generally at 11, supported on a suitable frame 12, and a drawer or skeleton frame 13 adapted to be moved into and out of said compartment. A door or closure member 14 is hingedly secured to this drawer in any desired manner, as shown at 15, and is adapted to fit snugly within a suitable flanged opening in the front wall 16 of the compartment or oven 11. It will be readily apparent that the door 14 may be hinged directly to the front wall 16 and the drawer per se eliminated by securing the broiler pan raising and lowering mechanism (to be later described) within the oven compartment 11, if such an arrangement is desired.

The drawer 13 comprises a skeleton frame made up of a front member 17, side members 18 and 19, and a rear member 21, rigidly secured together in any suitable manner. Rollers 22 may be rotatably mounted upon rearward extensions of the rear frame member 21 for engagement in suitable trackways provided at the sides of the compartment 11, and rollers 23 may be provided within the compartment to cooperate with the side frame members 18 and 19. These rollers 22 and 23 guide and support the drawer 13 in its movements in and out of the compartment or broiler oven 11.

Mechanism is provided in the drawer 13 for raising and lowering a broiler pan relative to the usual broiler burner (not shown) located adjacent the top of the compartment 11, which comprises a rod 24 extending longitudinally of the drawer and rotatably mounted in any desired manner adjacent its forward end in the front frame member 17. At its rear end the rod 24 is or may be rotatably mounted in a bearing bracket 25 which in turn is secured to the rear frame member 21. The bearing member 25 is provided with a forwardly extending circumferential flange 26 (Fig. 5) with the under surface of which one or more spring-pressed frictional plugs or studs 27 are adapted to cooperate. Each of the studs 27 is mounted in a radially inclined recess provided in a segmental member 28 which in turn is rigidly mounted on the rod 24 in any desired manner. The frictional contact between the studs 27 and the flange 26 of the stationary bearing member 25 will prevent accidental displacement of the rod 24 and associated parts from any adjusted position.

Rod 24 is provided adjacent each end with an upstanding arm 29 rigidly secured thereto in any suitable manner. Pivotally secured at their lower ends to the front frame member 17 and a bracket 31, respectively, are a pair of arms 32 which are similar to the arms 29. The rearward pair of arms 29, 32 and the forward pair of arms 29, 32 are each pivotally connected at their upper ends by means of pins 33 with a link 34. A pan supporting member 35 is slidably mounted between each of the links 34 and the arms 29 and 32, by means of a pair of elongated slots 36 therein co-operating with the pins 33.

Supported on the two members 34 is a broiler pan 37, of any desired construction, which may be provided with depending marginal flanges 38 at the front and rear ends thereof having a notch or cut-away portion 39 which is adapted to fit over a pin 41, the inner end of which is secured to the supporting member 35, whereby the pan is prevented from sliding longitudinally of the supporting members 35.

Rotatably mounted on each of the pins 41 is one end of a compensating link 42, the other end of each of said links being pivoted at 43 to its related arm 29. The links 42 are dimensioned and located to hold the movement of the pan supporting members 35 to a straight vertical line in the raising and lowering thereof through the operation of the parallel motion mechanism comprising the members 24, 29, 32, 33 and 34, the pins 33 sliding in the slots 36 in such movement. A spring 44, secured at one end to the rear pivot pin 43 and at the other end to the frame of the drawer in any suitable manner, as at 45, may be provided to aid in counterbalancing the weight of the pan 37, its associated mechanism, and the product being cooked.

In order to actuate the above described broiler pan lowering and raising mechanism, a gear segment 46 is rigidly secured in any suitable manner to the forward end of the rod 24 immediately in front of the frame member 17. The gear segment 46 is in constant engagement with and adapted to be actuated by a gear segment 47 which is rotatably mounted in any desired manner to a frame member 48 within and forming a part of the door 14. The teeth on the respective segments 46 and 47 are so dimensioned and formed that they are always in mesh with each other regardless of the angular position assumed by the segment 47 due to the pivotal movement of the door 14.

Formed integrally with the gear segment 47 or rigidly secured thereto in any suitable manner is a slotted lever 49. Co-operating or engaging with the slot in the lever 49 is a pin 51 which is secured to one end of a lever 52, the other end of which is rigidly secured to the stub shaft of a handle 53 in any desired manner, as by means of a screw 54. The handle 53 is rotatably mounted in the door frame member 48, and may be maintained in proper position by means of spacing washers 55 mounted on its stub shaft.

With the above described arrangement, it will be readily apparent that rotation of handle 53 will, through members 52, 51 and 49, operate gear segment 47 which will in turn actuate gear segment 46 and the broiler pan raising and lowering mechanism whether the door 14 is in open, closed, or partially open position. It will also be apparent that the friction device 26—28 will maintain the pan, its associated mechanism and the product to be cooked in any adjusted position.

A stop member or lug 57 is or may be formed integral with the front frame member so as to be contacted by the front arm 32 to limit the downward movement of the pan 37, and the upward movement thereof may be limited by the pins 33 contacting the left-hand end of the slots 36. Additional stop members 58 and 59 may also be formed integral with the door frame member 48 for limiting the upward and downward movement, respectively, of the broiler pan by being extended into the path of travel of the lever 52 (Fig. 4).

Hingedly mounted to the door 14 adjacent the hinge points 15, are two stop members 61, to the other end of each of which is secured one end of a door counterbalancing spring 62 which is anchored at its other end in any suitable manner, as at 63, to the side frame members 18 and 19, respectively, of the drawer 13. Intermediate their ends on their lower surfaces the members 61 are provided with a suitable notch (Fig. 2) forming a shoulder which is adapted to abut against a lug 64, formed integral with the front frame member 17, to limit the downward movement of the door 14.

It will be apparent that the above described mechanism constitutes a broiler structure in which the closure member may be opened to give access to the product being cooked without removing the latter from the oven compartment, while still permitting vertical adjustment of the broiler pan from the exterior of the closure member in any position of the latter.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a broiler oven having a broiler pan and means for adjustably supporting the pan therein for vertical movement, a closure member for said oven pivotally secured thereto, and means mounted in said closure member for adjusting said pan supporting means to vary the vertical position of said broiler pan in any position of said closure member.

2. In a broiler compartment having a broiler pan, means for adjustably supporting the pan therein for vertical movement and an opening in the front wall thereof, a pivoted door for closing said opening, and means mounted on said door for controlling said pan supporting means to vary the vertical position of said broiler pan in any position of said door.

3. In a broiler oven having a broiler pan and means for raising and lowering the pan therein, a closure member for said oven pivoted for movement between open and closed positions, and control means for said pan raising and lowering means extending through said closure member and adapted to control said pan raising and lowering means in any position of said pivoted closure member.

4. In a broiler oven having a drawer positionable therein, a broiler pan, adjusting mechanism carried by said drawer for varying the vertical position of said pan, and an opening for said drawer in the front wall of said oven; a pivotally mounted closure member for said opening, and means for actuating said pan adjusting mechanism extending through said closure member, whereby said closure member may be opened to give access to said broiler pan without removing said drawer from said oven, and said actuating means may be operated in any position of said closure member.

5. In a broiler compartment having a broiler pan and mechanism for adjusting said pan vertically relative to said compartment, a pivotally mounted door for said compartment, a member mounted on said door so as to be in constant engagement with a part of said pan adjusting mechanism, and means extending exteriorly of said door for actuating said member to adjust said pan in any position of said door.

6. In a broiler compartment having a broiler pan and mechanism for adjusting the vertical position of said pan, a gear member for actuating said pan adjusting mechanism, a pivotally mounted door for said compartment, a second gear member mounted on said door so as to engage said first gear member in any position of said door, and means extending exteriorly of said door for actuating said second gear member to actuate said first gear member when said door is in any position.

7. In a broiler compartment having a broiler pan and mechanism for adjusting said pan vertically relative to said compartment, a pivotally mounted door for said compartment, a member mounted on said door so as to be in constant engagement with a part of said pan adjusting mechanism, means extending exteriorly of said door for actuating said member to adjust said pan in any position of said door, and a friction device for maintaining said pan and said mechanism against accidental displacement in any adjusted position thereof.

8. In a range having a broiling compartment, a broiler drawer slidably mounted in said compartment, a broiler pan support in said drawer, elevating mechanism carried by said drawer for supporting and varying the vertical position of said broiler pan support, a door hinged to the front end of said drawer and forming a closure for said compartment, means carried by said door for actuating said elevating mechanism, and means forming a constantly operative driving connection between said elevating mechanism and said actuating mechanism in all positions of said door.

HARRY PLETCHER.
MARK BISHOP.
BENJAMIN C. JONES.